April 23, 1940.   W. JOHNSTON, JR   2,198,252
POT SUPPORT
Filed Aug. 18, 1939   2 Sheets-Sheet 1
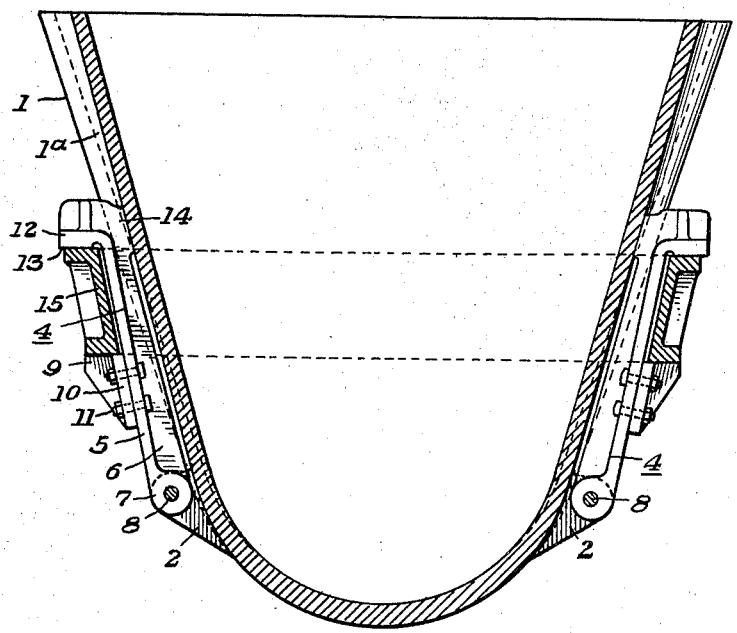
FIG. I.
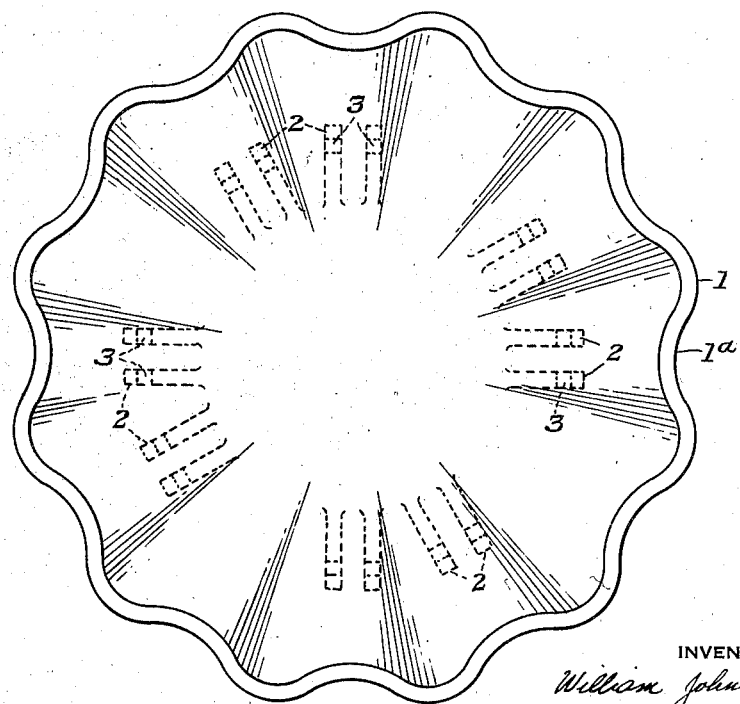
FIG. II.
INVENTOR
William Johnston, Jr.
by Christy and Wharton
attorneys April 23, 1940.  W. JOHNSTON, JR  2,198,252
POT SUPPORT
Filed Aug. 18, 1939   2 Sheets-Sheet 2
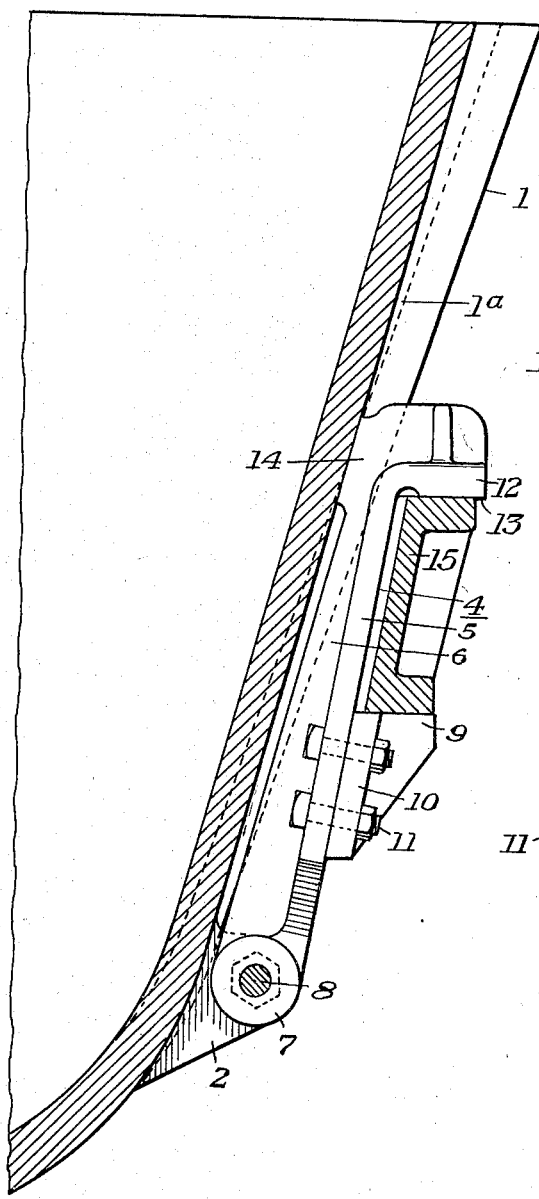
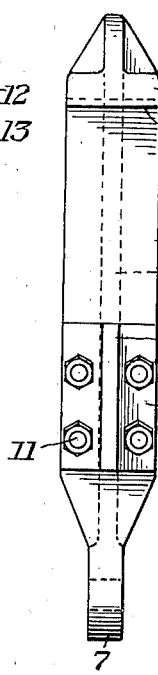
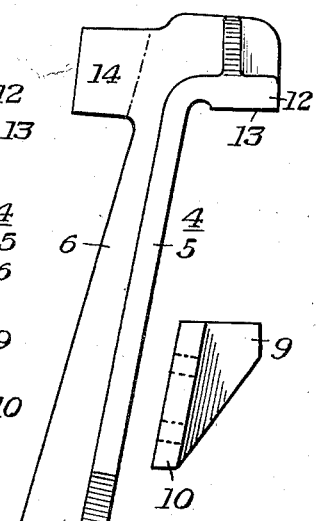
INVENTOR
William Johnston, Jr.
by Christy and Wharton
his attorneys Patented Apr. 23, 1940

2,198,252

UNITED STATES PATENT OFFICE 2,198,252

POT SUPPORT

William Johnston, Jr., Wilkinsburg, Pa.

Application August 18, 1939, Serial No. 290,852

2 Claims. (Cl. 266—39)

This invention relates to a supporting cradle, for cinder and slag pots, and other vessels for containing slag, cinder, matte, dross, or molten ferrous or non-ferrous metals.

The object of my invention is to provide in association with vessels of that sort a supporting structure and assembly, which posses adjustability to compensate for irregularities and defects in the elements of the assembly; which is flexible to conform the supported vessel and the supporting elements assembled with it to differences in expansion and contraction of the vessel and its supporting structure when the vessel is heated to a high temperature; and which are organized to support the vessel in balance by an engagement in a relatively low and relatively cool region of the vessel.

In the drawings Fig. I is a vertical sectional view through a vessel, shown as one of the more specialized types of vessel used to hold slags and the like materials, and generically termed "cinder pots," and showing elements of the supporting structure, or cradle, of my invention assembled with the vessel. Fig. II is a plan view of the specialized vessel of Fig. I, merely indicating the points at which elements of the supporting cradle may suitably be attached to it. Fig. III is a detail view taken in vertical section, showing on an enlarged scale one of the elements of the vessel-supporting structure or cradle. Fig. IV is a front elevation of one of the said supporting elements, showing it detached from the vessel. Fig. V is a side elevation of the supporting element of Fig. IV, but showing it in a condition in which it has not yet been fully prepared for attachment with a vessel in the support of which it is to cooperate.

In the drawings reference numeral 1 designates a vessel, which is shown as a cinder, or slag pot of the corrugated type to illustrate that my supporting cradle may be applied to a vessel having a side wall so contoured, as well as to a cinder pot, ladle, kettle, or like vessel having a side wall of simple contour. Adjacent the bottom of the vessel, and in line with the valleys, or inward bows, of the corrugated side wall there are a plurality of lugs 2, arranged in pairs. As shown, these lugs are provided with bolt holes 3 aligned in each pair.

The supporting structure comprises a plurality of like mounting arms 4, made of two intersecting webs 5 and 6. Each arm is at its lower end provided with an eye 7. In assembly with the vessel, the eye 7 is inserted between a pair of lugs 2, and is secured thereto by a bolt 8. The angular position of each of the arms individually with respect to the wall of the vessel is thus determinable in assembling the arms with the vessel. Mounted on the outwardly presented web 5 of the mounting arm, is a clamping bracket 9, consisting of an outwardly projected portion, and a base 10. As shown, the base 10 of the bracket is provided with bolt holes for attachment to the web 5 of the mounting arm by bolts 11.

At its upper end the arm 4 has a head 12 which presents a face 13 toward the bracket 9, and has an oppositely positioned projection 14, which in assembly extends toward, and in the assembly contacts the side wall of the vessel with which the supporting cradle is associated.

In assembly, the mounting arms 4, in any desired number for which the vessel is prepared, engage a supporting ring 15 between their heads 12 and the clamping brackets 9 which they carry. The supporting ring 15, thus connected with the vessel, may be a trunnion ring, a bail ring, or a ring organized in any manner to support the vessel.

As supported from ring 15 it is apparent that the load of the vessel and its contents is taken by the arms 4 at the level of their connection with the side wall of the vessel, and that the load is not actually taken at the level of the vessel at which the ring lies. If a metallic vessel of this general sort is put to such use that it stands for a substantial length of time approximately full of hot slag or molten metal, the side wall of the vessel tends to reach its highest temperature in a zone relatively remote both from the top and bottom of the vessel. It is, therefore, desirable that the load of the vessel and its contents be taken in a region of the vessel wall which tends to remain at a lower temperature.

It will be noted that the elements of the supporting structure do not have a great proportion of their area in contact with the wall of the vessel, and that they do not, therefore, tend to be heated to a temperature so high as to distort them. In assembly they space the supporting ring from direct contact with the wall of the vessel. It is also possible for the mounting arms 4, of the supporting structure, to turn slightly on bolts 8 in compensation for expansion difference between the wall of the vessel and the elements of the supporting structure.

It is of substantial importance that in assembly of the supporting structure, or cradle, with the cinder pot or similar vessel, the mounting arms are within the ring, and between the ring and the vessel to which they attach it. By giving them adjustability in making the assembly, accommodation may be made to the internal dimensions of the supporting ring, or to the distortion of the ring in one, or more, dimensions.

The elements of the supporting structure are in assembly adjustable to the dimensions of the supporting ring. As each of the elements is individually adjustable with respect to the vessel and the supporting ring, they may also in assembly be adjusted to distortion of the ring in any of its dimensions.

This adjustability in assembly rises in one particular from the fact that the bolt holes, which determine the position of the clamping bracket on the mounting arm, may be made at the time of assembly. They may, if necessary, be made at different levels on different arms of the cradle, so that each of the supporting elements has a seat properly proportioned to the dimensions of the ring in the locality in which that supporting element engages it.

The distance which the ring seat of each of the supporting elements is spaced from the side wall of the vessel is also determinable in assembly. This is done by making the projection 14 at the head of each of the arms 4 longer than will probably be necessary. The heads may then each be chipped, burned, or ground down to a length which is appropriate in the assembly. That is, they will all be diminished in length to a greater or lesser extent, with rings which are uniformly of greater or lesser interior dimensions. If a ring is not regular in its internal dimensions, the projections 14 on different arms may be diminished in length to a different extent in accommodation to the irregularity in the internal dimensions of the ring.

It is to be understood that the various terms used herein, such as "ring," "arm" and "bracket," are terms of description and not of limitation. For example, the "ring" used on vessels of non-circular cross-sectional area will itself desirably be non-circular. It may be a one-piece structure, as is usual with rings of that sort, or may consist of a plurality of ring sections. Numerous modifications in the form and arrangement of the supporting structure of my invention may be made without departing from the spirit of my invention as defined in the appended claims.

It further is conceivable that the supporting structure of my invention may have utility in supporting vessels used in industries other than the metal industries, and it is not to be considered as limited to assembly only with vessels used to hold hot material of any particular sort.

I claim as my invention:

1. A supporting structure for metallic vessels purposed to hold hot materials and when filled susceptible to the formation of a zone of highest temperature partway of the vessel height which comprises a plurality of load-carrying arms arranged outwardly around the vessel and pivoted on a lower part of the vessel wall below the hot zone thereof to extend upwardly of the vessel from their pivotal points, and a supporting ring embracing the said vessel adjacent the zone of highest temperature thereof and engaged by the said arms upwardly of their pivotal points for transmitting the load of the vessel in upright position thereof from the lower part of the vessel wall to the ring.

2. A supporting structure for metallic vessels purposed to hold hot materials and when filled susceptible to the formation of a zone of highest temperature partway of the vessel height which comprises a plurality of load-carrying arms arranged outwardly around the vessel and pivoted on the lower part of the vessel wall below the zone of highest temperature thereof to extend upwardly of the vessel from their pivotal points, a supporting ring embracing the said vessel adjacent the zone of highest temperature thereof, and ring-embracing structures on the said arms embracingly engaging the said ring for suspending the load of the vessel from the ring in upright position of the vessel and for supporting the vessel from the ring in upset position of the vessel.

WILLIAM JOHNSTON, Jr.